United States Patent
Jones

(10) Patent No.: US 8,931,735 B2
(45) Date of Patent: Jan. 13, 2015

(54) TEMPORARY CLAMP-ON LANDING GEAR WHEEL SAFETY ZONE FENCE

(71) Applicant: The Boeing Company, Chicago, IL (US)

(72) Inventor: Johnathan M. Jones, Seattle, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 13/663,717

(22) Filed: Oct. 30, 2012

(65) Prior Publication Data

US 2014/0117155 A1    May 1, 2014

(51) Int. Cl.
B64C 25/00    (2006.01)

(52) U.S. Cl.
USPC ..................................... 244/100 R; 244/121

(58) Field of Classification Search
USPC ....... 244/100 R, 103 R, 110 R, 110 C, 114 R, 244/115, 121; 49/40; 256/44, 45; 160/351, 160/352; 47/32.4
See application file for complete search history.

(56) References Cited

U.S. PATENT DOCUMENTS

| | | | | |
|---|---|---|---|---|
| 108,280 | A | * | 10/1870 | Merrick .......................... 47/32.4 |
| 472,137 | A | * | 4/1892 | McCallip ........................ 47/32.4 |
| 514,306 | A | * | 2/1894 | Clines ............................ 47/32.4 |
| 2,572,342 | A | * | 10/1951 | Huett ......................... 244/100 R |
| 3,866,860 | A | | 2/1975 | Opitz |
| 3,972,493 | A | * | 8/1976 | Milne ........................... 244/115 |
| 4,936,420 | A | * | 6/1990 | Nenstiel ........................... 188/37 |
| 5,058,827 | A | * | 10/1991 | Dansereau et al. ........ 244/103 R |
| 5,427,210 | A | * | 6/1995 | Willaford ......................... 188/32 |
| 6,007,023 | A | * | 12/1999 | Lehman ..................... 244/110 R |
| 6,896,223 | B2 | * | 5/2005 | Fulcher et al. ............... 244/111 |
| 7,059,567 | B1 | * | 6/2006 | Scorziello ..................... 244/121 |
| 2007/0095977 | A1 | * | 5/2007 | Gabrys ..................... 244/103 R |

FOREIGN PATENT DOCUMENTS

| | | |
|---|---|---|
| GB | 557444 A | 11/1943 |
| JP | 2007276751 A | 10/2007 |
| SU | 296384 A1 | 8/1976 |

* cited by examiner

*Primary Examiner* — Tien Dinh
*Assistant Examiner* — Michael Kreiner
(74) *Attorney, Agent, or Firm* — Felix L. Fischer

(57) ABSTRACT

A safety device to separate personnel from landing gear tires which incorporates a clamping collar configured to wrap around a landing gear post. A support frame extends outward from the clamping collar and defines a perimeter around the landing gear. A mesh skirt extends downward from the support frame.

19 Claims, 12 Drawing Sheets

TEMPORARY CLAMP-ON LANDING GEAR WHEEL SAFETY ZONE FENCE

BACKGROUND INFORMATION

1.. Field

Embodiments of the disclosure relate generally to the field of aircraft ground handling and more particularly to a removable barrier for attachment to an aircraft landing gear to create a personnel safety zone.

2.. Background

Ground handling of large commercial aircraft often requires that personnel be present under and around the aircraft while the aircraft is in motion. In certain operations spotters or other ground personnel may be in proximity to the moving landing gear and wheels. Downward rotation of a forward rolling wheel can create deceptive perception regarding distance and speed which may result in an individual inadvertently venturing too close to the wheel. If an individual walks too close to a downward rotating wheel it can trap, trip or catch a toe or foot. Clothing, feet or other appendages may also be snagged or caught by the rotating wheel resulting in injury.

It is therefore desirable to provide a safety device to create an exclusion zone around aircraft landing gear and physically catch or deflect personnel who may be impinging on the exclusion zone.

SUMMARY

Embodiments disclosed herein provide a safety device to separate personnel from landing gear tires which incorporates a clamping collar configured to wrap around a landing gear post. A support frame extends outward from the clamping collar and defines a perimeter around the landing gear. A mesh skirt extends downward from the support frame.

The embodiments disclosed provide a method for landing gear safety by attaching a collar to a landing gear leg and spacing a perimeter hoop from the collar. A mesh skirt is then extended from the perimeter hoop to near ground level.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
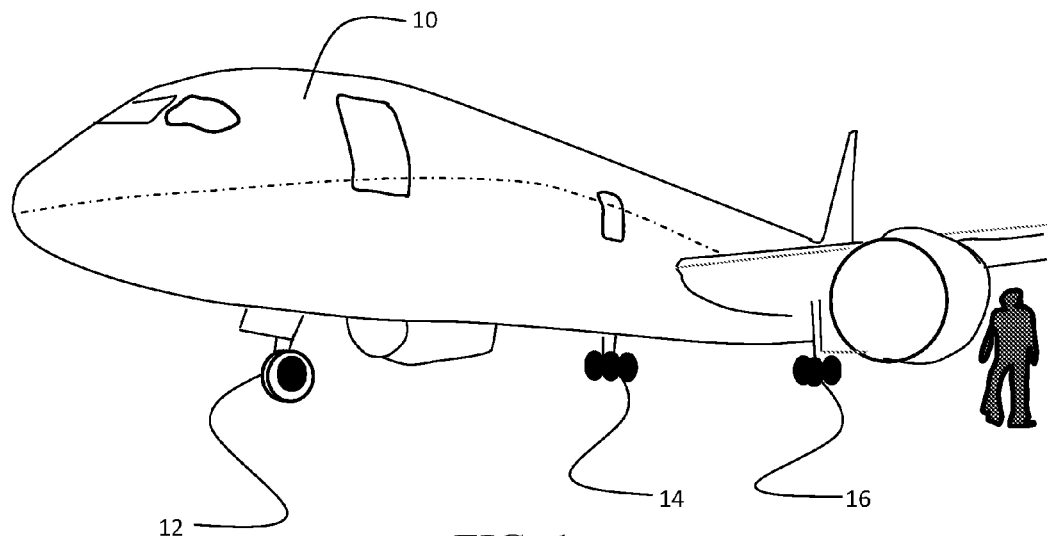
FIG. 1 is a pictorial view of a large commercial aircraft during ground handling operations.

Embodiments disclosed herein provide a support frame and mesh barrier attachable to an aircraft landing gear to create a safety zone around the landing gear wheel. Referring to the drawings, FIG. 1 shows a commercial aircraft 10 during ground operations. The landing gear of the aircraft include a nose gear 12 under the flight deck of the fuselage and main gear 14, 16 aft at the fuselage and wing attachment fairing.

Figure 2:
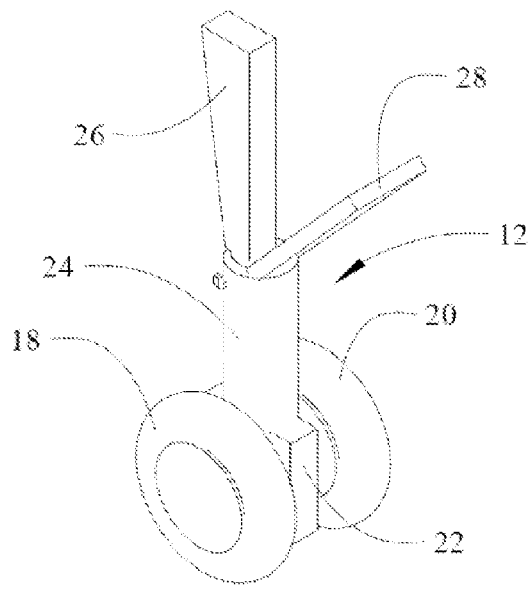
FIG. 2 is a simplified view of an example nose landing gear.

FIG. 2 shows a representative nose gear 12 in simplified form. While the embodiments are described herein with respect to the nose gear 12, the same or alternative embodiments may be employed on the main gear 14 and 16 as well. Nose gear 12 incorporates two wheels 18, 20 which are attached with an axle (not shown) received through a housing 22. A substantially cylindrical gear leg 24 extends upward from the housing and terminates in an attachment strut 26. A drag link support 28 extends aft from the leg for additional structural support.

Figure 3:
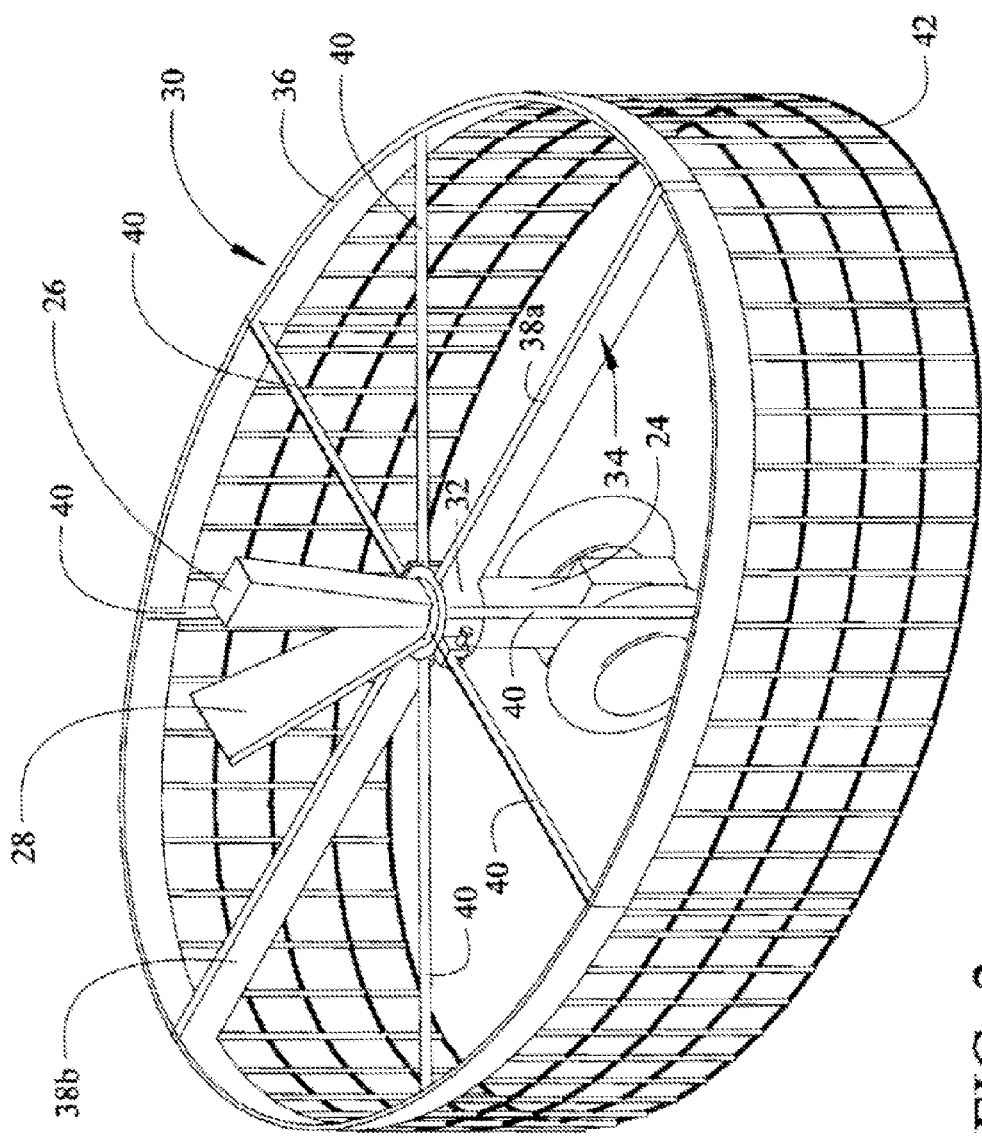
FIG. 3 is an isometric view of a first embodiment of the safety zone fence as installed on the landing gear.

An embodiment of the safety zone fence (SZF) 30 is shown in FIG. 3. A collar 32, which will be described in greater detail subsequently, is attached to nose gear leg 24 to secure the SZF to the nose gear 12. In other embodiments alternative attachment locations on the gear leg or other structure of the landing gear assembly may be employed to support and secure the SZF. A support frame 34 extends from the collar and includes a perimeter hoop 36 surrounding the landing gear 12 and spaced from the collar 32 by fore and aft struts 38a and 38b and spokes 40. While shown as differing in geometric configuration in the embodiments of the drawings, the struts and spokes may be of common shape. The struts and spokes provide structural support to suspend the perimeter hoop 36 and prevent radial deformation of the perimeter hoop. A mesh skirt 42 extends downward from the perimeter hoop 36 to establish the safety zone and prevent encroachment into the safety zone by personnel. Height of the perimeter hoop 36 establishes a top or first level of the safety zone and the mesh skirt extends downward substantially to ground level. The struts 38a, 38b, spokes 40, perimeter hoop 36 and mesh skirt 42 may be metal, such as aluminum or light weight steel or rigid plastic or composite material with sufficient strength to physically displace a person from the path of the landing gear 12 while in motion or, as a minimum, restrain the person from engaging the landing gear tires. Sufficient rigidity is provided to allow a person contacting the SZF to grasp the structure to stabilize themselves to prevent falling if contacted by the SZF. The embodiment shown in the drawings is elliptical in shape however a circular, quadrilateral or other alternative geometric shape may be employed.

Figure 4A:
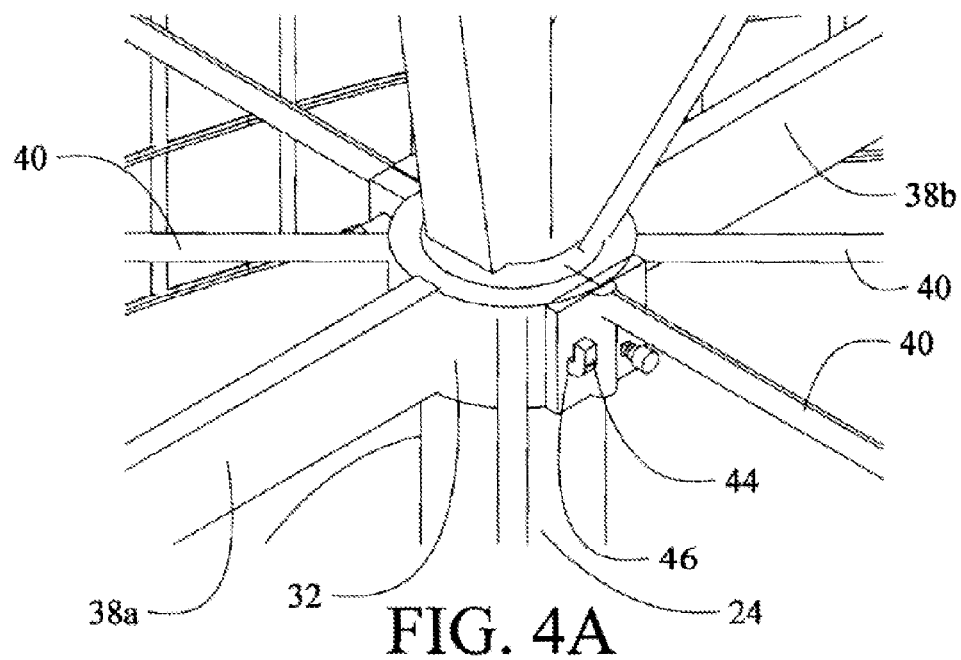
FIGS. 4A-4C are isometric close up views of the engagement collar of the safety zone fence.
Figure 4B:
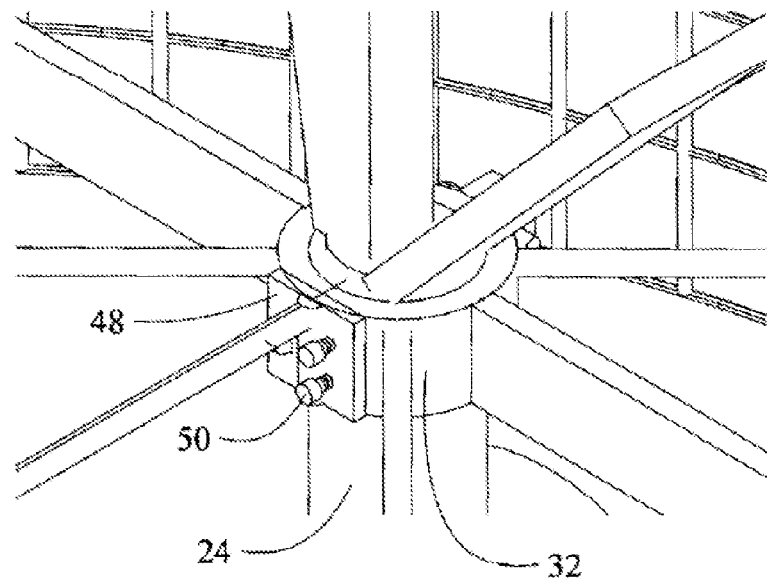
Figure 4C:
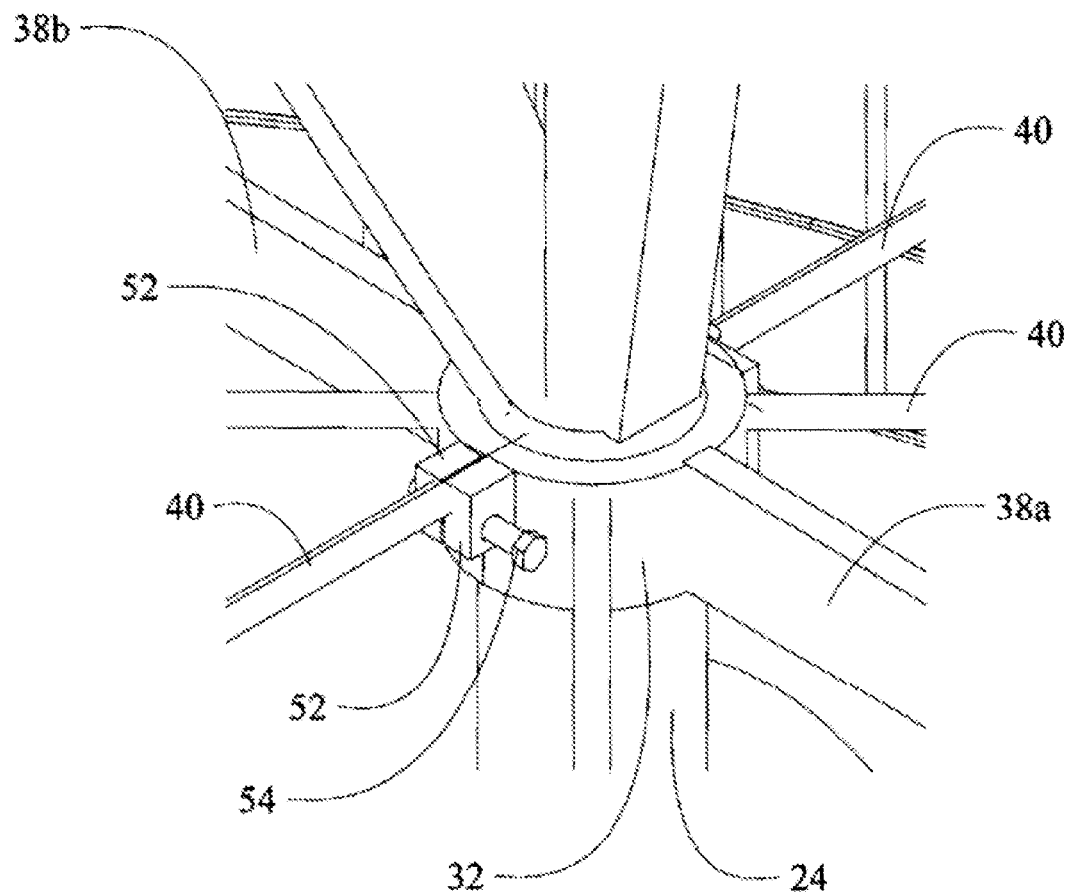

Details of an exemplary collar 32 are shown in FIGS. 4A, 4B and 4C. Collar 32 is adapted to be secured on the gear leg 24. For the embodiment shown, an indexing key 44 extends from the gear leg 24 and is received in a mating aperture 46 in the collar as best seen in FIG. 4A. The key may be an existing structural element on the landing gear leg 24 or an added member. For the embodiment shown, the key 44 additionally provides vertical support for the collar 32. For the embodiment shown, the SZF is bifurcated on the minor axis for attachment and disassembly from the gear leg. The collar 32 is bifurcated for attachment around the gear leg 24 and mating halves of the collar 32a and 32b may be secured with a boss 48 extending from a forward half of the collar and fasteners 50 extending through the boss into the rear half of the collar as best seen in FIG. 4B. For the embodiment shown in the drawings and detailed in FIG. 4C, cinch blocks 52 extend from the forward and rear halves of the collar 32 and receive a threaded fastener 54 to circumferentially tension the collar around the gear leg 24. While shown in the drawings as a hex head bolt, the fastener may be a hand tightened clamp such as a wing nut or self-ratcheting handle. Friction created by the collar prevents turning of the assembled SZF on the gear leg and provides vertical support to allow the landing gear 12 to carry the SZF.

Figure 5:
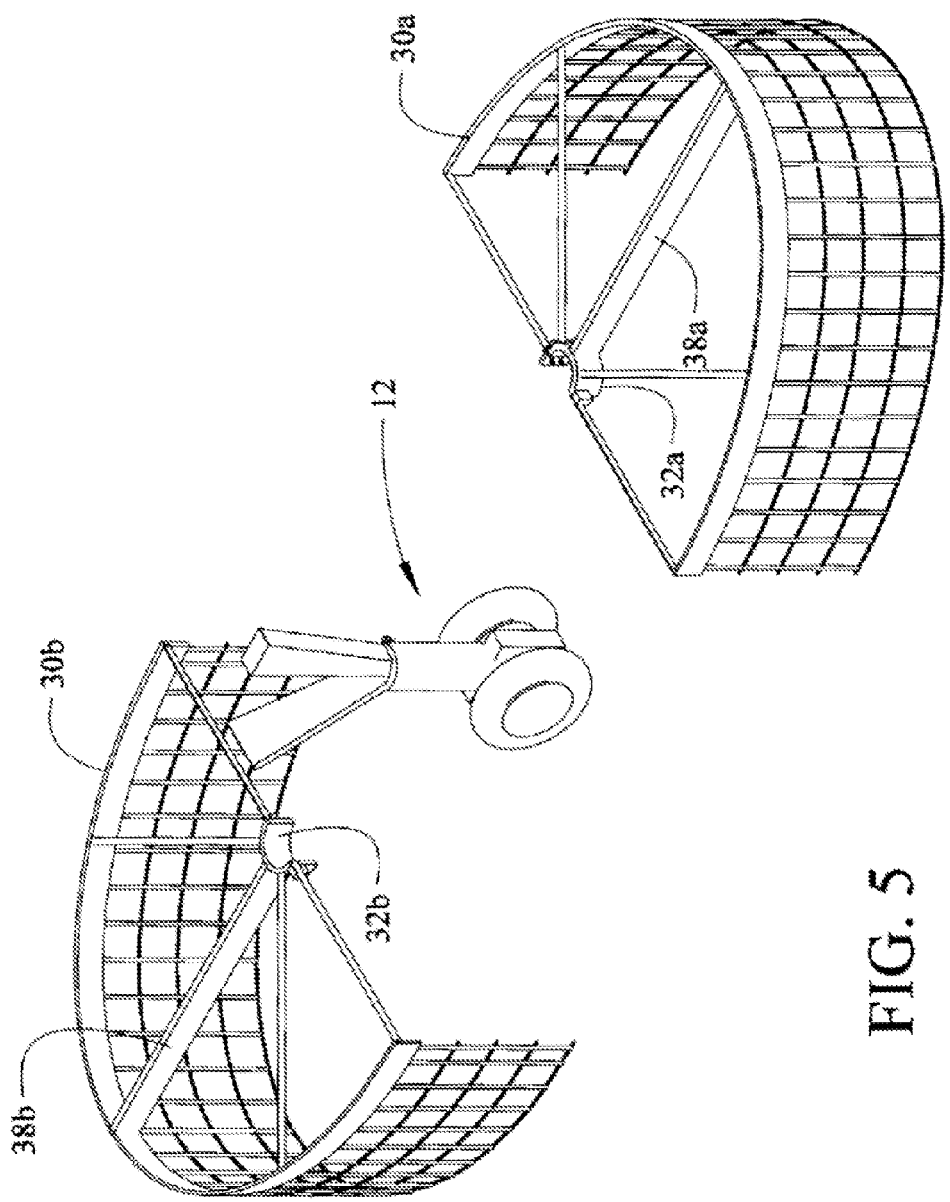
FIG. 5 is an isometric exploded view of the safety zone fence elements for installation on an aircraft landing gear.
Figure 6:
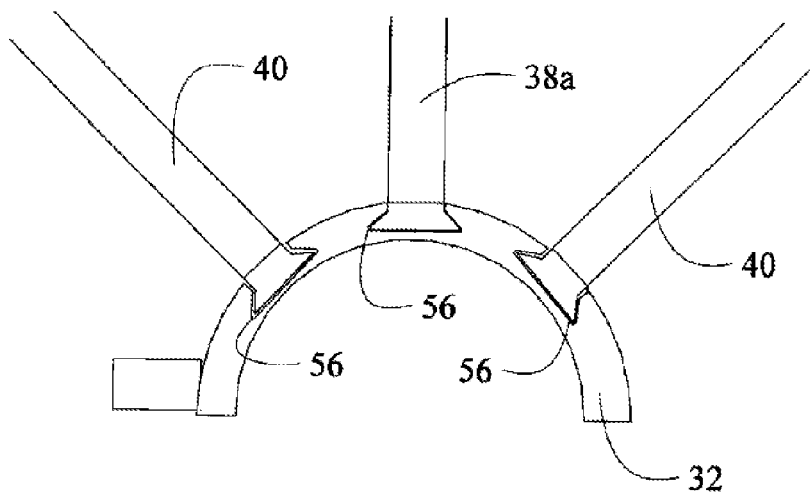
FIG. 6 shows an alternative attachment of struts and spokes to the collar.

As shown in FIG. 5, the SZF 30 may be separated for attachment and removal from the landing gear 12. A forward section 30a and a rear section 30b are positioned in front of and behind the landing gear as shown. The elements are then brought together and the forward and rear elements of the collar 32a and 32b are secured as previously described. The assembled SZF then provides the secure zone as shown in FIG. 3. In alternative embodiments, the forward and rear elements of the collar 32a and 32b may be separately mounted on the gear leg 12. Struts 38a, 38b and spokes 40 may then be inserted in keyed slots 56 or similar attachments in the collar as shown in FIG. 6.

Figure 7:
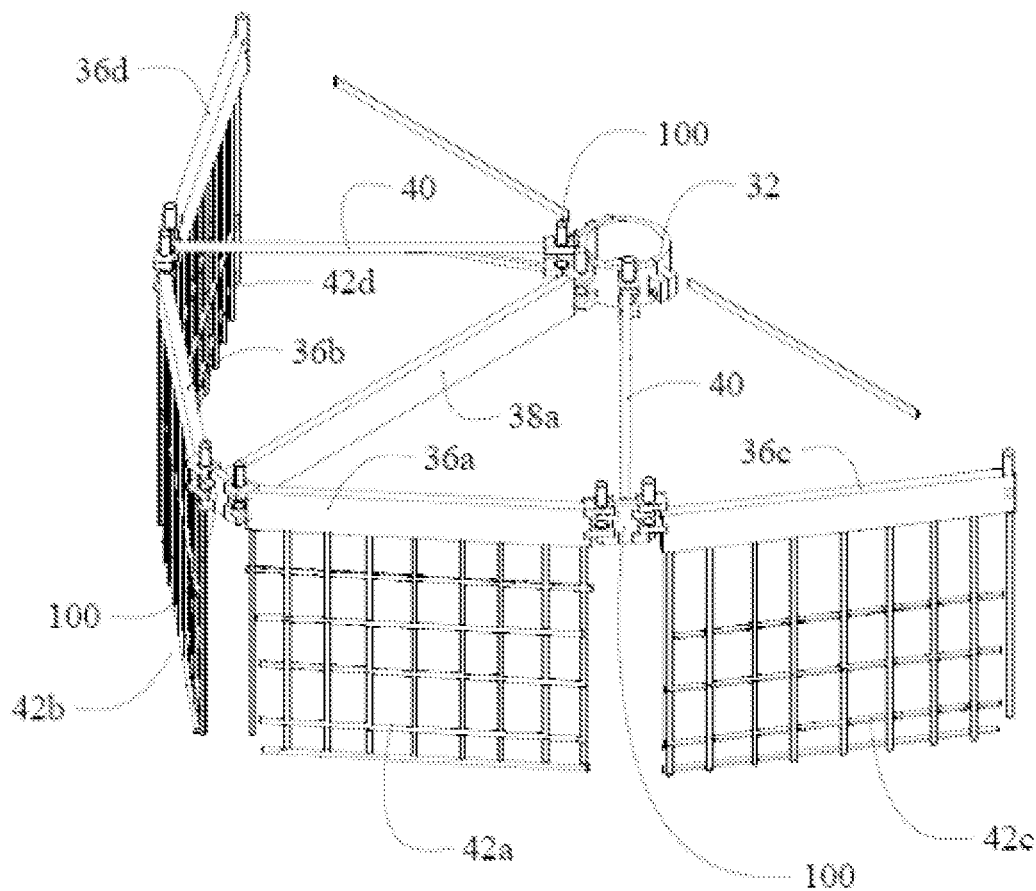
FIG. 7 shows an isometric view of a second embodiment of the safety zone fence with a second alternative attachment of struts and spokes to the collar.
Figure 8:
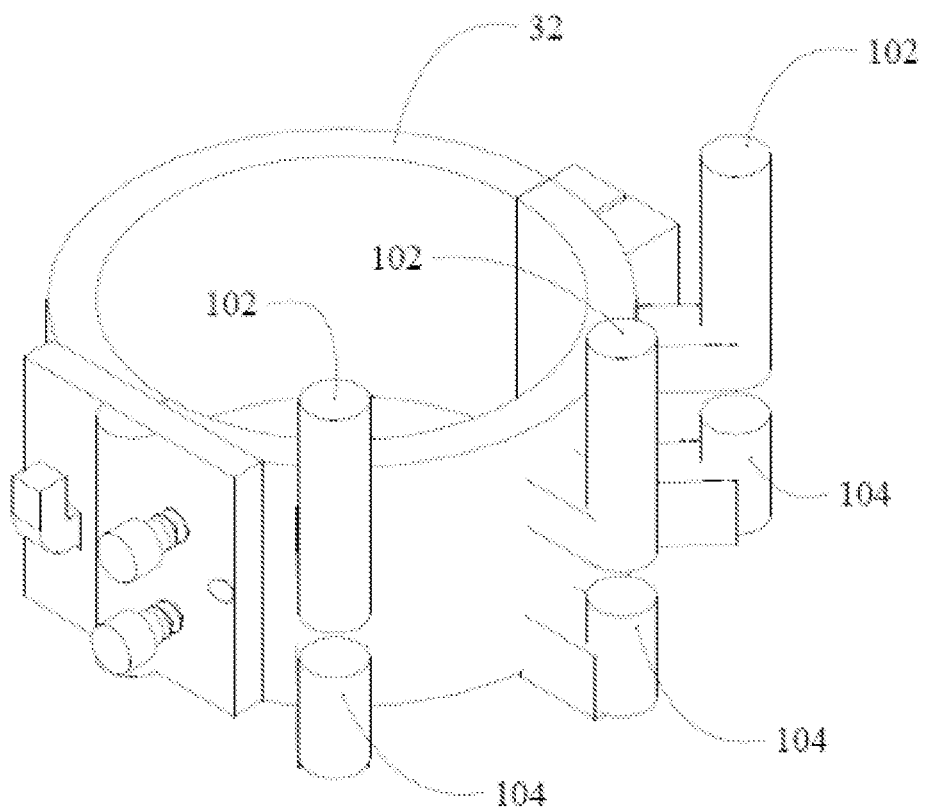
FIG. 8 is a detailed isometric of the collar of the second embodiment.
Figure 9:
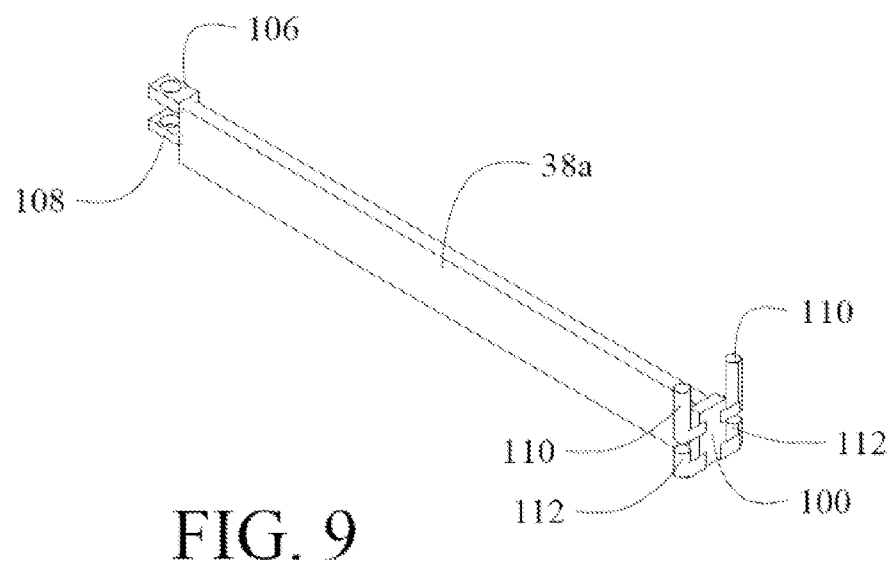
FIG. 9 is a detailed isometric of an exemplary strut for the second embodiment.

A second embodiment of the SZF employing separate segmented elements forming the perimeter hoop and mesh skirt as shown in FIG. 7. Hoop segments 36a, 36b, 36c and 36d may be employed to form the forward section 30a of the SZF supporting mesh skirt segments 42a, 42b, 42c and 42d (while shown as flat segments the hoop and mesh skirt segments may be arcuate). The struts as exemplified by forward strut 38a and spokes 40 employ connection assemblies 100 to removably support the hoop segments and, in turn are removably supported on hooks 102 extending from the collar 32. As shown in detail in FIG. 8, collar 32 may employ upper hooks 102a and lower hooks 104 to provide additional rigidity to receive the mating apertured flanges 106 and 108 respectively of the strut 38a as shown in detail in FIG. 9. The spokes 40 may be bifurcated adjacent the collar providing angled arms 41 to attach to the lower hooks (as best seen in FIG. 7). Similarly, the connection assembly 100 on the struts and spokes may employ upper hooks 110 and lower hooks 112 to be received in the mating apertured flanges 114 on the perimeter hoop sections. Cotter pins or similar securing elements may be employed to secure the assembled aperture flanges on the hooks.

Figure 10:
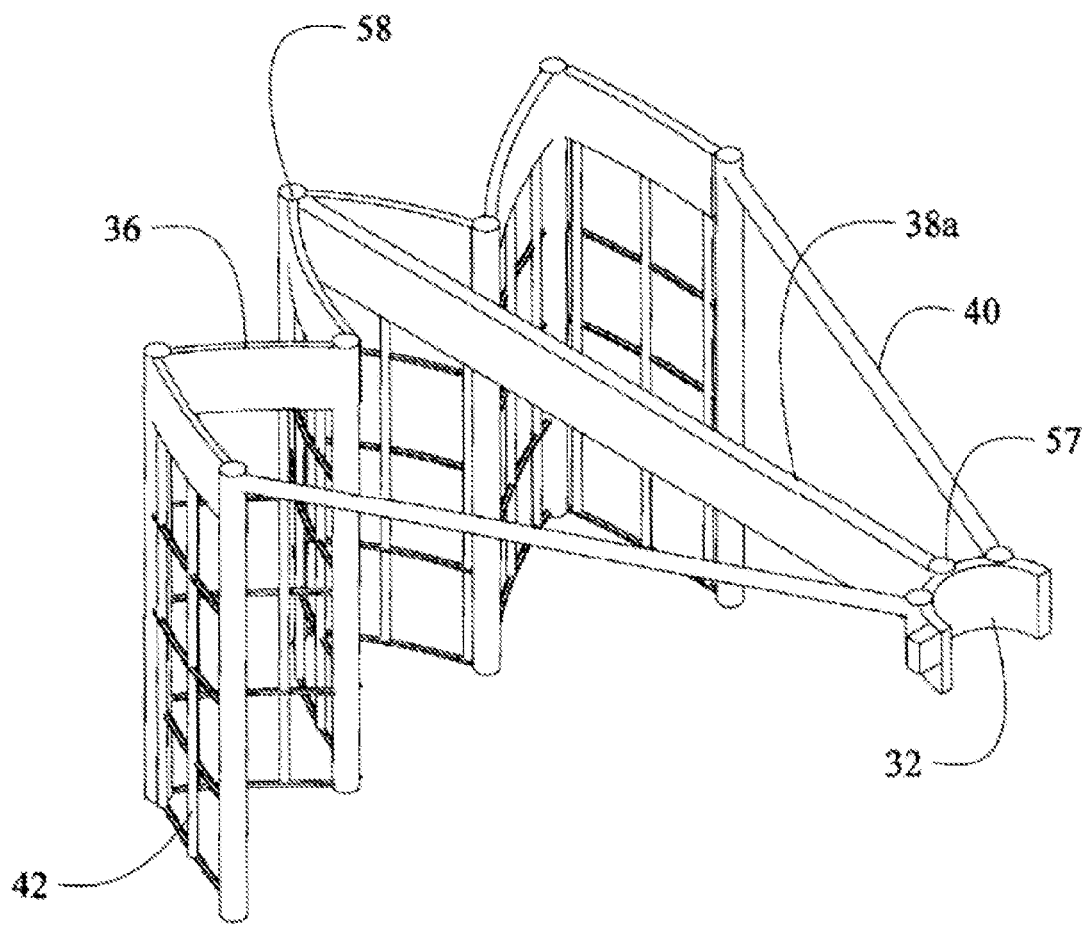
FIG. 10 shows an accordion pleat embodiment.

As yet another alternative, the struts 38a, 38b and/or spokes 40 may be pivotally mounted to the collar 32 with hinges 57 and perimeter hoop 36 and skirt 42 may be equipped with multiple hinges 58 to allow them to be collapsed in accordion pleats as shown in FIG. 10.

Figure 11A:
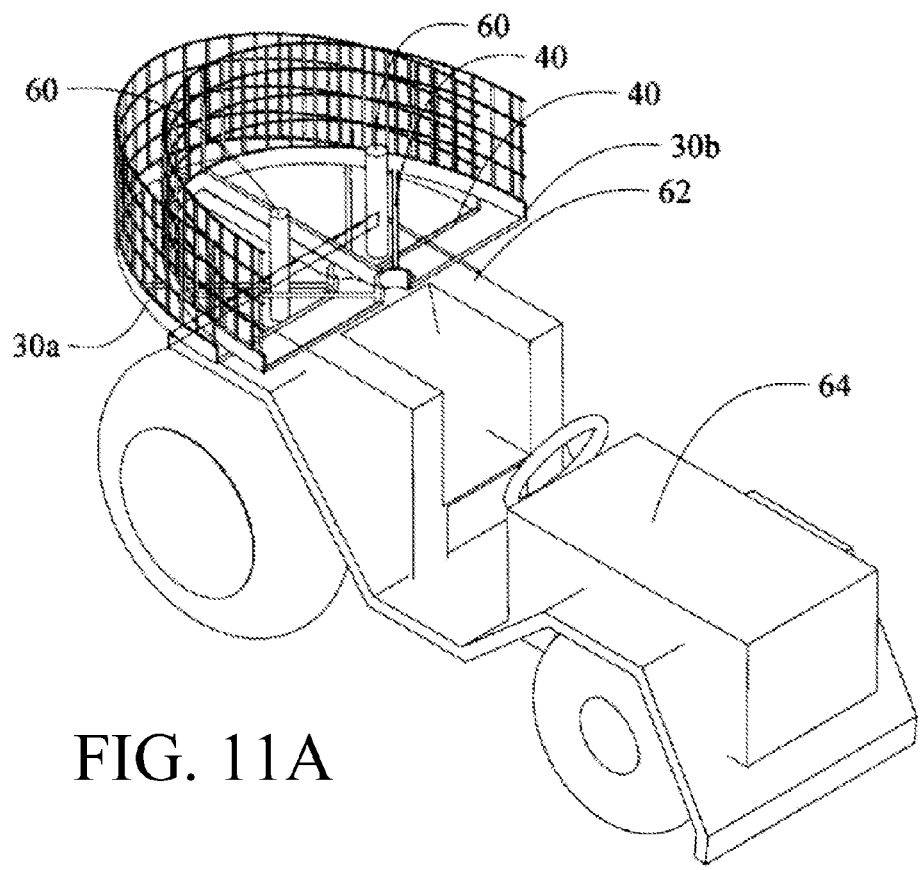
FIGS. 11A and 11B are an isometric view and side view of a storage rack for the first embodiments of the safety zone fence on an aircraft tug; and, FIGS. 12A 12B an isometric view and side view of a storage rack for the second embodiment of the safety zone fence on an aircraft tug.
Figure 11B:
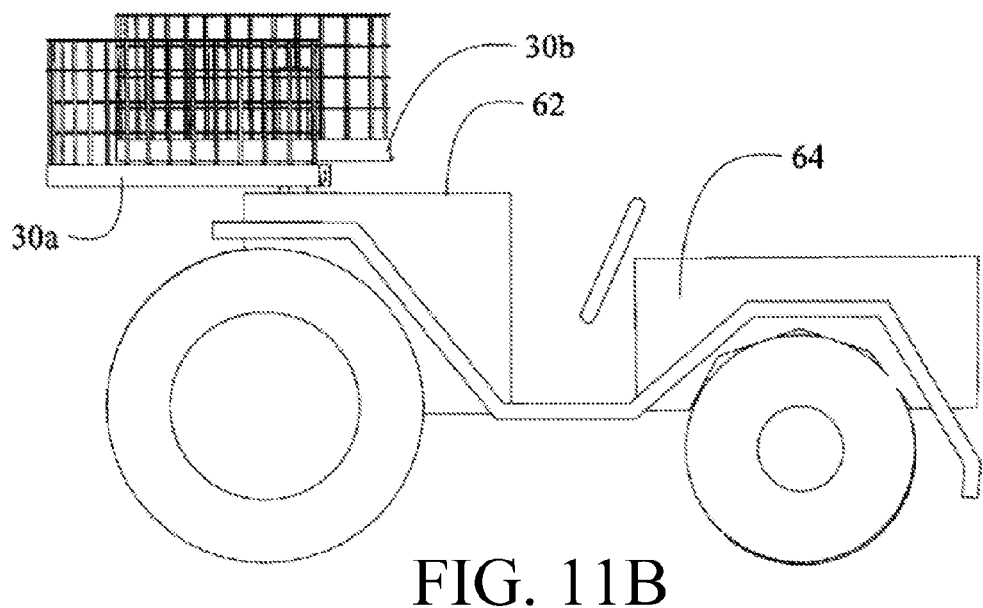

The embodiment of the SZF as shown in FIGS. 3 and 5 may be carried stored and transported on a tow tug 64 with a rack adapted to engage the spokes 40 as shown in FIGS. 11A and 11B. A separate trailer may be employed to carry the SZF elements and towed by the tug. One or more cylindrical posts 60 extending from a rear deck 62 of the tug are engaged between the spokes to support the SZF halves 30a and 30b which are nested. Alternative vertical suspending racks may also be employed.

Figure 12A:
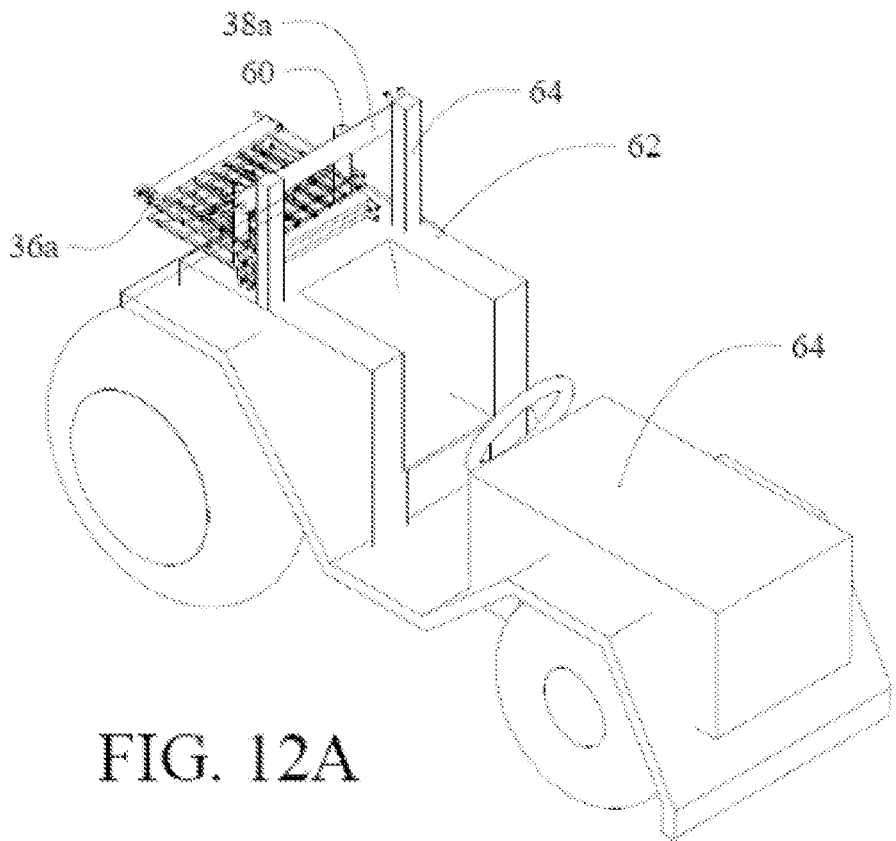
Figure 12B:
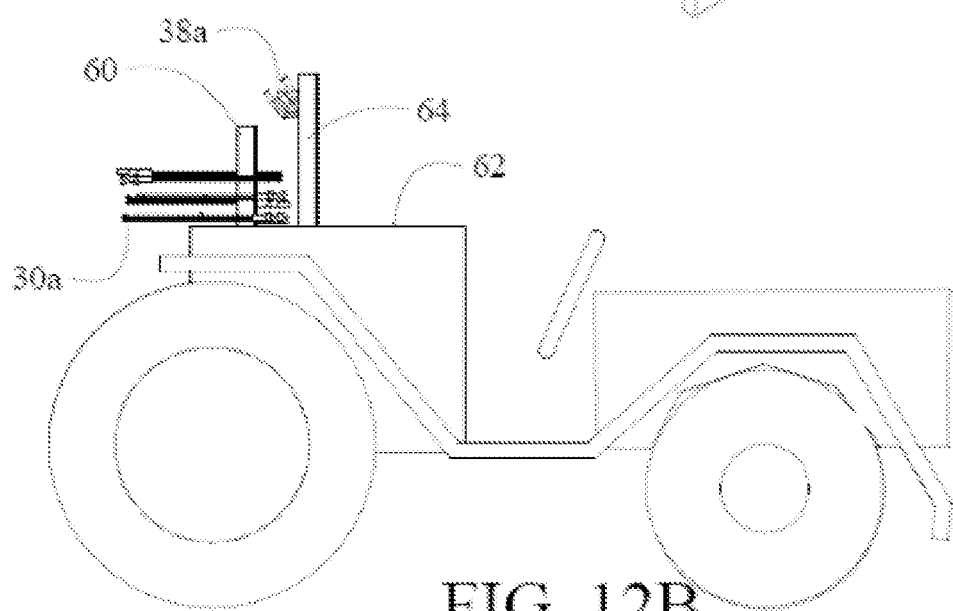

Similarly, the perimeter hoop sections of the second embodiment of the SZF shown in FIG. 7 may be disassembled and stored on the cylindrical racks of the tug with additional brackets 64 or support for the struts and spokes as shown in FIGS. 12A and 12B The embodiments disclosed provide a method for landing gear safety by attaching a collar to a landing gear leg and spacing a perimeter hoop from the collar. A mesh skirt is then extended from the perimeter hoop to near ground level. Spacing of the perimeter hoop may be accomplished by attaching struts between the collar and perimeter hoop. The struts may be attached by inserting the struts in keyed slots in the collar or rigidly secured by welding or other means. The perimeter hoop and mesh skirt may also be hinged for accordion pleat folding.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A safety device to separate personnel from landing gear tires, said safety device comprising:
    a clamping collar configured to wrap around a landing gear post;
    a support frame extending radially outward from said clamping collar that defines at least part of a perimeter surrounding the landing gear; and
    a mesh skirt extending downward from said support frame substantially to ground level;
    wherein the mesh skirt is substantially perpendicular to ground level.

2. The safety device according to claim 1 wherein said mesh skirt is configured to engage a person such that the person is restrained from engaging the landing gear tires.

3. The safety device according to claim 1 wherein said support frame is operable to support a person that holds onto said support frame.

4. The safety device according to claim 1 wherein said support frame and said mesh. skirt in combination are configured to provide a continuous barrier around the landing gear from a first level downward to a ground level.

5. The safety device according to claim 1 wherein said clamping collar includes a clamp that can be tightened by hand.

6. The safety device according to claim 1 wherein said support frame is collapsible in sections and configurable for storage on a rack attached to a tow tug.

7. A safety zone fence for aircraft landing gear comprising:
    a collar concentrically received on a landing gear leg;
    a support frame extending from the collar and having
        a perimeter hoop radially spaced from the collar,
        a plurality of struts attaching the perimeter hoop to the collar, and,
    a mesh skirt extending downward from the perimeter hoop substantially to ground level;
    wherein the mesh skirt is substantially perpendicular to ground level.

8. The safety zone fence as defined in claim 7 wherein the collar and the support frame are bifurcated tier attachment to and removal from the landing gear leg.

9. The safety zone fence as defined in claim 7 wherein the support frame is made from material selected from the set of aluminum, light weight steel, rigid plastic and composite materials.

10. The safety zone fence as defined in claim 7 wherein the mesh skirt is made from material selected from the set of aluminum, light weight steel, rigid plastic and composite materials.

11. The safety zone fence as defined in claim 7 further comprising an indexing post extending from the landing gear leg and received in an aperture in the collar.

12. The safety zone fence as defined in claim 7 wherein the struts are removably attached to the collar.

13. The safety zone fence as defined in claim 7 wherein the struts are attached to the collar with hinges.

14. The safety zone fence as defined in claim 7 wherein the perimeter hoop and mesh skirt are hinged to be collapsed in accordion pleats.

15. The safety zone fence as defined in claim 7 wherein the perimeter hoop is elliptical.

16. A method for landing gear safety comprising:
    attaching a collar to a landing gear leg;
    spacing a perimeter hoop from the collar to surround the landing gear leg; and,
    extending a mesh skirt from the perimeter hoop to near ground level;
    wherein the mesh skirt is substantially perpendicular to ground level.

17. The method of claim 16 further wherein the step of spacing a perimeter hoop includes attaching struts between the collar and perimeter hoop.

18. The method of claim 17 wherein attaching the struts includes inserting the struts in keyed slots in the collar.

19. The method of claim 17 wherein attaching the struts includes hinging the struts from the collar and hinging the perimeter hoop and mesh skirt for accordion pleat folding.

\* \* \* \* \*